(12) United States Patent
Bates et al.

(10) Patent No.: US 8,990,780 B2
(45) Date of Patent: Mar. 24, 2015

(54) SETTING BREAKPOINTS IN OPTIMIZED INSTRUCTIONS

(75) Inventors: Cary L. Bates, Rochester, MN (US); Kendrick Wong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/434,137

(22) Filed: Mar. 29, 2012

(65) Prior Publication Data

US 2013/0263094 A1 Oct. 3, 2013

(51) Int. Cl.
*G06F 9/44* (2006.01)
*G06F 11/36* (2006.01)

(52) U.S. Cl.
CPC .................. *G06F 11/3636* (2013.01)
USPC ........................................ 717/129

(58) Field of Classification Search
CPC ........................................ G06F 9/44
USPC ........................................ 717/129
See application file for complete search history.

(56) References Cited

U.S. PATENT DOCUMENTS

| | | | | |
|---|---|---|---|---|
| 3,937,938 A * | 2/1976 | Matthews | ........................ | 714/46 |
| 5,812,133 A * | 9/1998 | Schultz et al. | ................. | 715/809 |
| 5,844,795 A * | 12/1998 | Johnston et al. | ................. | 700/83 |
| 6,240,549 B1 * | 5/2001 | Hamada et al. | ................. | 717/130 |
| 6,854,073 B2 * | 2/2005 | Bates et al. | ................. | 714/38.13 |
| 7,191,441 B2 * | 3/2007 | Abbott et al. | ...................... | 718/1 |
| 8,074,207 B1 * | 12/2011 | Reilly | ............................ | 717/130 |
| 2002/0087950 A1 * | 7/2002 | Brodeur et al. | ................. | 717/124 |
| 2006/0155525 A1 * | 7/2006 | Aguilar et al. | .................. | 703/26 |
| 2012/0042303 A1 * | 2/2012 | Demetriou et al. | ........... | 717/129 |
| 2013/0263094 A1 * | 10/2013 | Bates et al. | .................... | 717/129 |

OTHER PUBLICATIONS

O2, XL Fortran V9.1 (for AIX) Choosing an Optimization Level, IBM (2004) retrieved from http://publib.boulder.ibm.com/infocenter/comphelp/v7v91/index.jsp?topic=%2Fcom.ibm.xlf91a.doc%2Fxlfug%2Fhu00509.htm on Dec. 22, 2013.*
O2, XL Fortran V9.1 (for AIX) Choosing an Optimization Level, IBM (2004) retrieved from http://publib.boulder.ibm.com/infocenter/comphelp/v7v91/index.jsp?topic=%2Fcom.ibm.xlf91a.doc%2Fxlfug%2Fhu00509.htm on Dec. 22, 2013.*
Katilin et al., Create memory snapshot on a breakpoint (Aug. 5, 2011) retrieved from http://forums.yourkit.com/viewtopic.php?f=2&t=3784 on Dec. 22, 2013.*

(Continued)

*Primary Examiner* — Don Wong
*Assistant Examiner* — Theodore Hebert
(74) *Attorney, Agent, or Firm* — Owen J. Gamon; Matthew C. Zehrer

(57) ABSTRACT

A method, computer-readable storage medium, and computer system are provided. In an embodiment, a command is received that specifies a debug compile option and requests a compile of a module into object code. If the debug compile option specifies a first debug compile option, snapshot instructions are inserted immediately prior to each machine instruction in the object code at which a breakpoint was previously set. If the debug compile option specifies the first debug compile option, snapshot instructions are inserted immediately prior to each machine instruction in the object code that implements a control flow statement.

18 Claims, 8 Drawing Sheets

(56) References Cited

OTHER PUBLICATIONS

Breakpoints, Core System Working with Command Syntax Using the Syntax Editor, IBM (2011) retrieved from http://pic.dhe.ibm.com/infocenter/spssstat/v20r0m0/index.jsp?topic=%2Fcom.ibm.spss.statistics.help%2Fsyntax_editor_breakpoints.htm on Dec. 22, 2013.*

GDB, Debugging with GDB, The Free Software Foundation (Jun. 2003) retrieved from http://www.delorie.com/gnu/docs/gdb/gdb_33.html on Jul. 18, 2014.*

Wong, Debugging in Eclipse (2010) retrieved from https://www.clear.rice.edu/comp310/Eclipse/debugging.html on Dec. 22, 2013.*

Lori Pollock et al., "Debugging Optimized Code via Tailoring," www.eecis.udel.edu/~hiper/papers/debugopt.ps, pp. 1-20, Proceedings of the 1994 ACM SIGSOFT International Symposium on Software Testing and Analysis, (Aug. 1994).

* cited by examiner

BREAKPOINT TABLE (157)

| MODULE ID (310) | BREAKPOINT LINE IDENTIFIER (312) | SWAPPED INSTRUCTION (314) |
|---|---|---|
| MODULE A | 1 | LOAD R1, A | 302
| MODULE A | 7 | STORE R1, A | 304

FIG. 3

SAVED BREAKPOINT LIST (159)

| MODULE ID (410) | BREAKPOINT LINE IDENTIFIER (412) |
|---|---|
| MODULE A | 1 | 402
| MODULE A | 7 | 404

DEBUG DATA

| MODULE ID (520) | LINE (522) | OFFSET (524) | SNAPSHOT FLAG (526) | |
|---|---|---|---|---|
| MODULE A | 1 | 200F | FALSE | 502 |
| MODULE A | 2 | 2800 | FALSE | 504 |
| MODULE A | 3 | 2870 | TRUE | 506 |
| MODULE A | 4 | 2950 | FALSE | 508 |
| MODULE A | 5 | 2980 | FALSE | 510 |
| MODULE A | 6 | 3020 | FALSE | 512 |
| MODULE A | 7 | 3060 | TRUE | 514 |

FIG. 5

SETTING BREAKPOINTS IN OPTIMIZED INSTRUCTIONS

FIELD

An embodiment of the invention generally relates to computer systems and more particularly to computer systems that execute optimized instructions.

BACKGROUND

Computer systems typically comprise a combination of computer programs and hardware, such as semiconductors, transistors, chips, circuit boards, storage devices, and processors. The computer programs are stored in the storage devices and are executed by the processors. Locating, analyzing, and correcting suspected faults in a computer program is a process known as "debugging." Bugs are problems, faults, or errors in a computer program. Typically, a programmer uses another computer program commonly known as a debugger to debug the program under development.

Conventional debuggers typically support three primary types of operations, which a computer programmer may request via a user interface. A first type is a breakpoint or address watch operation, which permits a programmer to identify with a breakpoint a precise instruction at which to halt execution of the program by the processor, or identify via an address watch, a memory location for the processor to monitor for content modification, at which time the program's execution is halted. The debugger may set a breakpoint by replacing a valid instruction at the location specified by the programmer with an invalid instruction, which causes a system exception when the program attempts to execute the invalid instruction, giving control of the processor to the debugger. The debugger may set an address watch via a function of the processor. As a result, when a program is executed by the debugger, the program executes on the processor in a normal fashion until the breakpoint is reached or the contents of the monitored memory location are written to, at which time the debugger halts execution of the program. A second type is a step operation, which permits a computer programmer to cause the processor to execute instructions in a program either one-by-one or in groups. After each instruction or group of instructions are executed, the debugger then halts execution of the program. Once the execution of the program is halted, either by step or breakpoint operations, conventional debuggers provide a third type of operation, which displays the content that is stored at various storage locations, in response to requests by the programmer. By this debugging process of halting the program at various instructions and examining the content of various storage locations, the programmer might eventually find the storage location whose stored content, such as an instruction or data, is incorrect or unexpected.

Some debuggers are used to debug programs created by optimizing compilers. An optimizing compiler may perform optimizations on programs that result in the values of variables used by the programs being kept in registers and not necessarily immediately stored to memory at the time that the programs modify the values. To understand this concept, consider the following example source program fragment, comprising statements 10 and 20:

10 A=B

20 A=A+D

In response to statement 10, a non-optimizing compiler might generate machine instructions that read the value of the variable B from the memory location assigned to the variable B and store the value to the memory location assigned to the variable A. In response to statement 20, the non-optimizing compiler might generate machine instructions that read the value of the variable A from the memory location assigned to the variable A, read the value of the variable D from the memory location assigned to the variable D, sum the values, and store the sum to the memory location assigned to the variable A. In contrast, an optimizing compiler might generate machine instructions that store the value of the variable B into a register assigned to the variable A, read the value of the variable D from the memory location assigned to the variable D, sum the value of the variable D and the register assigned to the variable A, and store the sum to the memory location assigned to the variable A. In this way, the optimizing compiler has eliminated a machine instruction that stores the value of the variable D to the memory location assigned to the variable A at statement 10, which may increase performance of the program since register operations may have better performance than memory operations.

SUMMARY

A method, computer-readable storage medium, and computer system are provided. A command is received that specifies a debug compile option and requests a compile of a module into object code. If the debug compile option specifies a first debug compile option, snapshot instructions are inserted immediately prior to each machine instruction in the object code at which a breakpoint was previously set. If the debug compile option specifies the first debug compile option, snapshot instructions are inserted immediately prior to each machine instruction in the object code that implements a control flow statement.

BRIEF DESCRIPTION OF THE SEVERAL VIEWS OF THE DRAWINGS

FIG. 3 depicts a block diagram of an example data structure for a breakpoint table, according to an embodiment of the invention.

FIG. 4 depicts a block diagram of an example data structure for a saved breakpoint list, according to an embodiment of the invention.

FIG. 5 depicts a block diagram of an example data structure for debug data, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
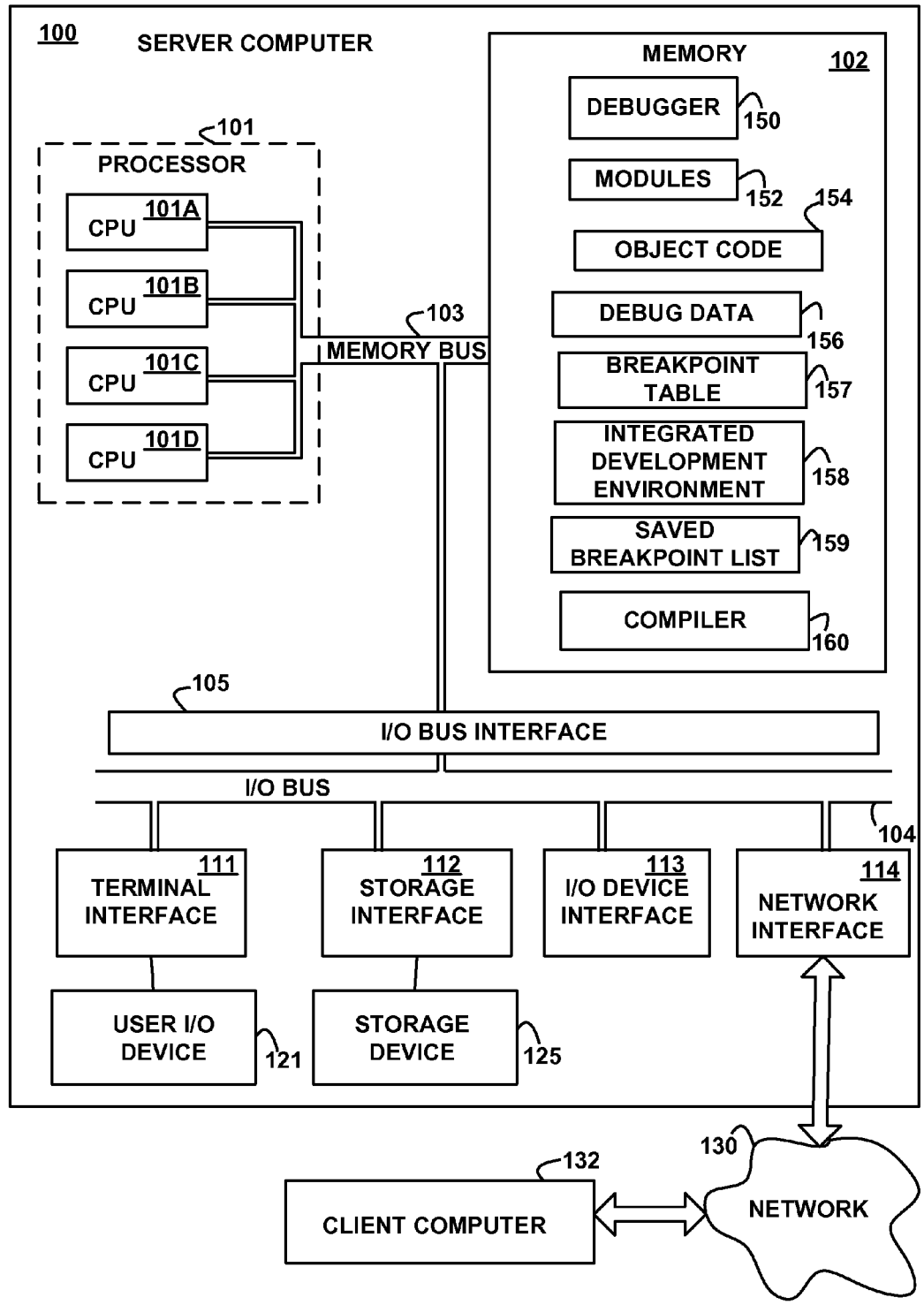
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network interface 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a debugger 150, modules 152, object code 154, debug data 156, a breakpoint table 157, the integrated development environment (IDE) 158, a saved breakpoint list 159, and a compiler 160. Although the debugger 150, the modules 152, the object code 154, the debug data 156, the breakpoint table 157, the integrated development environment (IDE) 158, the saved breakpoint list 159, and the compiler 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the debugger 150, the modules 152, the object code 154, the debug data 156, the breakpoint table 157, the integrated development environment (IDE) 158, the saved breakpoint list 159, and the compiler 160 are illustrated as being contained within the main memory 102, these elements are not necessarily all completely contained in the same storage device at the same time. Further, although the debugger 150, the modules 152, the object code 154, the debug data 156, the breakpoint table 157, the integrated development environment (IDE) 158, the saved breakpoint list 159, and the compiler 160 are illustrated as being separate entities, in other embodiments some of them, portions of some of them, or all of them may be packaged together.

In an embodiment, the debugger 150, the modules 152, the object code 154, the IDE 158, and the compiler 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, and 9. In another embodiment, the debugger 150, the IDE 158, and the compiler 160 are implemented in hardware via semiconductor devices, chips, logical gates, circuits, circuit cards, and/or other physical hardware devices in lieu of, or in addition to, a processor-based system. In an embodiment, the debugger 150, the modules 152, the object code 154, the IDE 158, and/or the compiler 160 comprise data in addition to instructions or statements.

The compiler 160 compiles the modules 152, which comprise source code or statements, into the object code 154, which comprises machine instructions that execute on the processor 101. In an embodiment, the compiler 160 translates the modules 152 into an intermediate form before translating the intermediate form into the object code 154. In an embodiment, the compiler 160 is a just-in-time compiler that executes as part of an interpreter. In an embodiment, the compiler 160 is an optimizing compiler. In various embodiments, the compiler 160 performs peephole optimizations, local optimizations, loop optimizations, inter-procedural or whole-program optimizations, machine code optimizations, or any other optimizations to reduce the amount of time the object code 154 uses to execute and/or to reduce the amount of memory that the object code 154 uses to execute. In an embodiment, the optimizations performed by the compiler 160 result in the values of variables used by the object code 154 being kept in registers and not necessarily immediately stored to memory at the time that the object code 154 modifies the values.

The memory bus 103 provides a data communication path for transferring data among the processor 101, the main memory 102, and the I/O bus interface 105. The I/O bus interface 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network interface 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
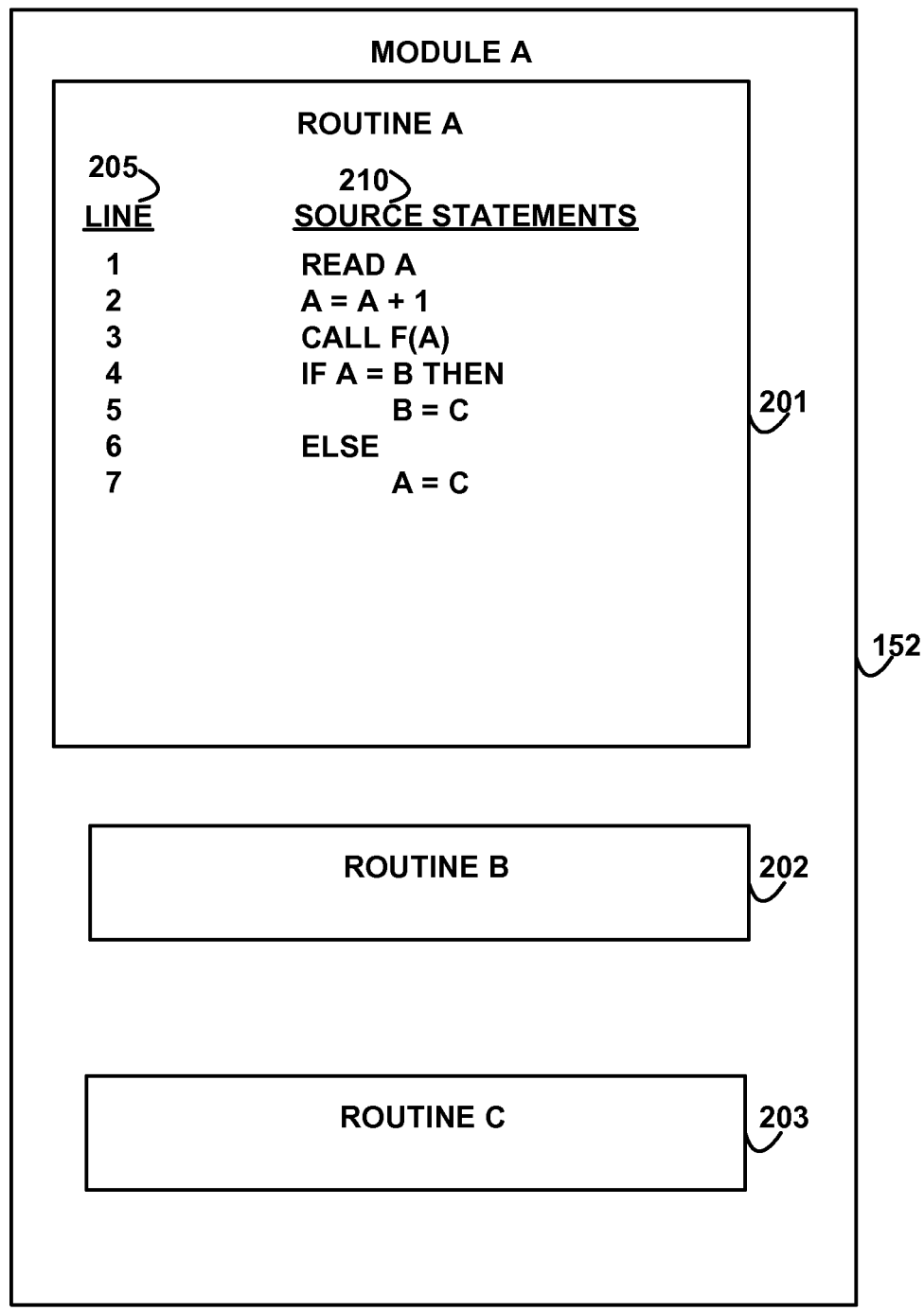
FIG. 2 depicts a block diagram of an example module, according to an embodiment of the invention.

FIG. 2 depicts a block diagram of an example module A 152, according to an embodiment of the invention. The module A 152 comprises any number of routines, such as the routine A 201, the routine B 202, and the routine C 203. The example routine A 201 comprises example source statements 210 and corresponding lines 205 at which the source statements 210 are stored in the routine 201. Each of the source statements 210 is identified by its respective line 205 and exists or is stored at its respective line 205, which are numbered sequentially from beginning to end of the routine 201 or the module 152. The source statements 210 are human-readable source code.

FIG. 3 depicts a block diagram of an example data structure for a breakpoint table 157, according to an embodiment of the invention. The breakpoint table 157 comprises any number of entries, such as the entries 302 and 304, each of which comprises a module identifier field 310, a breakpoint line identifier field 312, and a swapped instruction field 314. The module identifier field 310, in each entry, specifies an identifier of the module, such as one of the modules 152, in which the debugger 150 has set a breakpoint. The breakpoint line identifier 312, in each entry, specifies a line or an address within the module 152 (specified by the module identifier field 310 in the same entry) of the line, statement, or instruction in the module 152 at which the debugger 150 has set a breakpoint. The swapped instruction 314, in each entry, specifies the machine instruction that previously existed at a location in the object code 154 that implements the line in the module 152 (identified by the breakpoint line identifier 312 and the module identifier field 310 in the same entry) and which the debugger 150 swapped out of the object code 154, replacing the swapped machine instruction with an invalid opcode. In response to the processor 101 attempting to execute the invalid opcode, the processor 101 halts the execution of the object code 154 and raises an interrupt, which the debugger 150 receives, giving the debugger 150 control of the processor 101. When the user is ready to restart the object code 154, the debugger 150 replaces the invalid opcode with the swapped instruction 314 and restarts the object code 154 executing again, on the processor 101.

FIG. 4 depicts a block diagram of an example data structure for a saved breakpoint list 159, according to an embodiment of the invention. The saved breakpoint list 159 comprises identifiers of breakpoints that were set in a previous debug session of the object code 154 that has ended, and the identified breakpoints are no longer set in the object code 154. The saved breakpoint list 159 comprises any number of entries, such as the example entries 402 and 404, each of which comprises an example module identifier field 410 and a breakpoint line identifier field 412. The module identifier field 410, in each entry, specifies an identifier of the module, such as one of the modules 152, in which the debugger 150 set a breakpoint in a previous debug session. The breakpoint line identifier 412, in each entry, specifies a line or an address within the module 152 (specified by the module identifier field 410 in the same entry) of the line, statement, or instruction in the module 152 at which the debugger 150 previously set a breakpoint during a previous debug session, but at which a breakpoint is no longer set.

FIG. 5 depicts a block diagram of an example data structure for debug data 156, according to an embodiment of the invention. The debug data 156 comprises example records 502, 504, 506, 508, 510, 512, and 514, each of which comprises an example module ID (identifier) field 520, a line field 522, an offset field 524, and a snapshot flag field 526.

The module ID field 520, in each record, identifies one of the modules 152 and optionally a routine within the module 152. The line field 522, in each record, identifies a line 205 in the module 152 identified by the module identifier field 520, in the same record. The offset field 524, in each record, specifies the offset (or number of bytes, words, or double words), from the beginning of the object code 154, at which the machine instructions are stored in the object code 154 that the compiler 160 created to implement the source statement 210 (when executed) at the line identified by the line field 522, in the same record of the debug data 156.

The snapshot flag field 526, in each record, specifies whether or not snapshot instructions exist in the object code 154 immediately before the machine instructions that implement the source statement at the line identified by the line field 522, specified by the same record in the debug data 156 and after the machine instructions that implement the source statement at the immediately preceding line. Snapshot instructions are machine instructions that, when executed by the processor 101, store all values of all variables referenced anywhere (regardless of whether the variables are referenced by the line identified by the line field 522) by the module 152 from registers specified by the compiler 160 (the registers are not specified or referenced by source statements in the module 152) to locations in the memory 102 that represent or contain the variables. If the value of the snapshot flag field 526 indicates true, then the snapshot instructions exist, and if execution of the object code 154 halts at the machine instructions at the offset 524, then the values of the variables are present in the memory 102. If the value of the snapshot flag field 526 indicates false, then the snapshot instructions do not exist, so at the time of execution of the machine instructions at the offset 524, the current values of the variables might be present in the memory 102 or might be present in registers created by the compiler 160 but not present in the memory 102.

Figure 6:
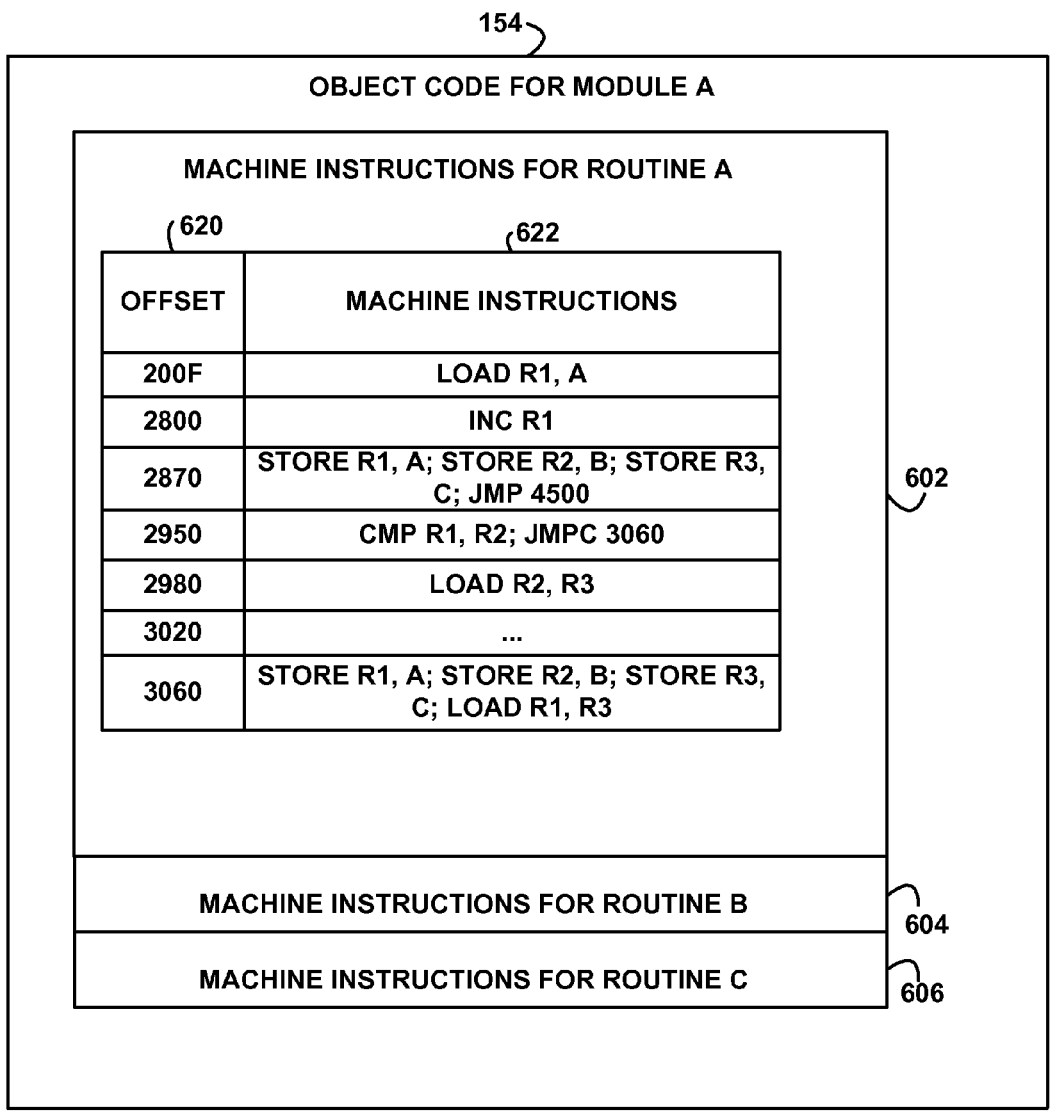
FIG. 6 depicts a block diagram of example object code, according to an embodiment of the invention.

FIG. 6 depicts a block diagram of example object code 154, according to an embodiment of the invention. The object code 154 comprises example machine instructions 602 for the routine A of the module A, machine instructions 604 for the routine B of the module A, and machine instructions 606 for the routine C of the module A. The machine instructions 602, when executed on the processor 101, implement the routine A 201 of the module A 152. The machine instructions 604, when executed on the processor 101, implement the routine B 202 of the module A 152. The machine instructions 606, when executed on the processor 101, implement the routine C 203 of the module A 152.

The machine instructions 602 comprise any number of entries, each comprising an offset field 620 and a machine instructions field 622. The offset field 620, in each entry, comprises the offset, distance, or amount of storage between the start of the machine instructions 602 (or alternatively the start of the object code 154) and the entry. The debugger 150 maps the lines in the module 152 to the machine instructions in the object code 154 that implement the source statement in the lines via matching values in the offset field 524 (FIG. 5) and the offset field 620 (FIG. 6) in the machine instructions 602.

Thus, for example, "load r1, A" at offset 200F represents the machine instruction that implements line 1 of the module 152 and, when executed, reads the value from the memory location of variable A into register R1. "Store R1, A; Store R2, B; Store R3, C" at offsets 2870 and 3060 represent the machine instructions of the snapshot instructions, which store the values from the registers R1, R2, and R3 to the memory locations that store the respective variables A, B, and C, which are all of the variables referenced by the example module 152. The snapshot instructions are immediately before their associated machine instructions, e.g., the "Store R1, A; Store R2, B; Store R3, C" at offset 2870 are immediately before "JMP 4500" (which implements the source statement "CALL F(A)" at line 3 of the module 152) and immediately after "INC R1" (which implements the source statement "A=A+1" at line 2 of the module 152). For convenience of exposition and ease of understanding, the machine instruction field 622 in FIG. 6 illustrates example assembly language instructions, but the actual machine instructions executed by the processor 101 are binary codes, in an embodiment. In other embodiments, the processor 101 may execute any appropriate type of machine instructions.

Figure 7:
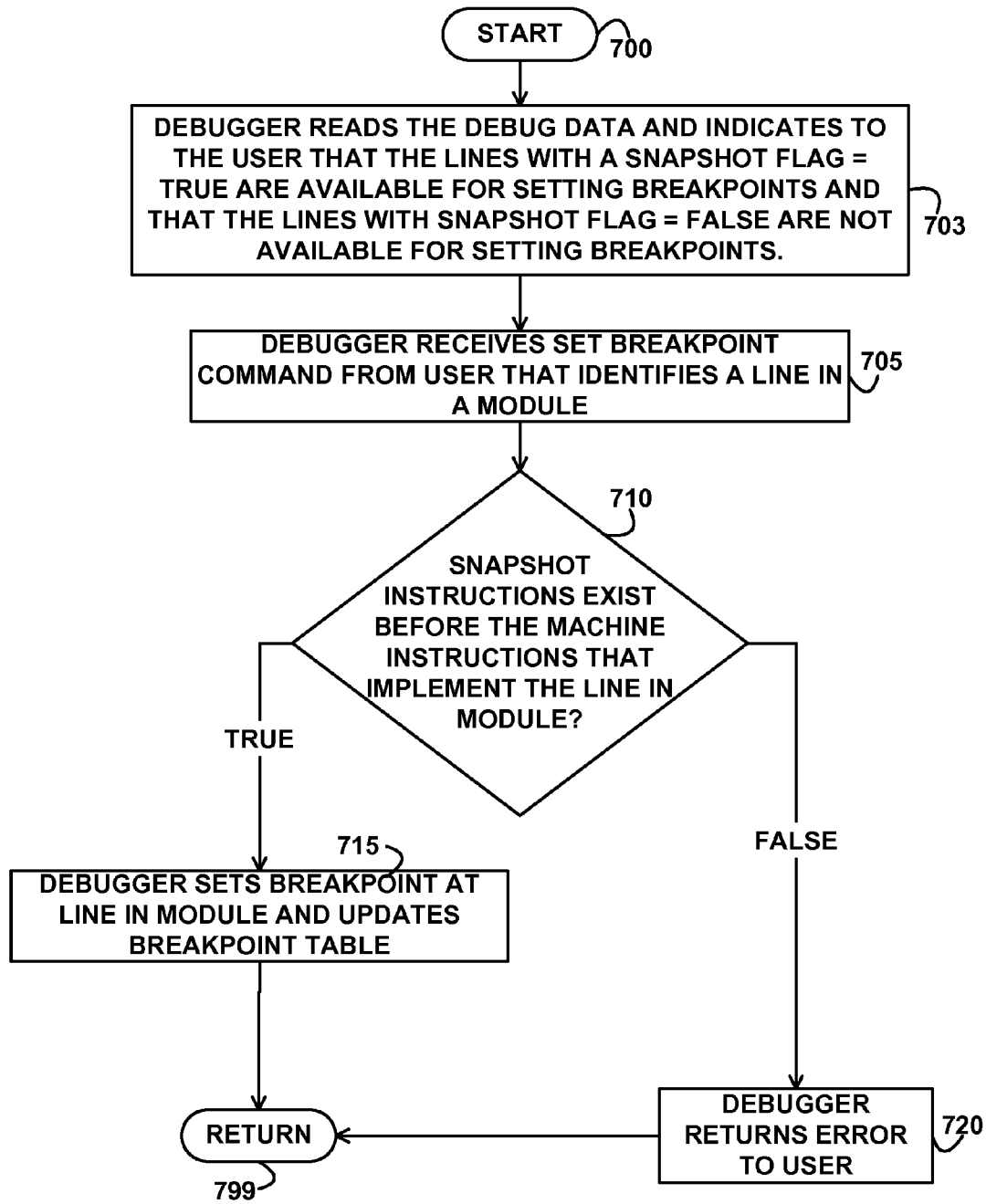
FIG. 7 depicts a flowchart of example processing for a set breakpoint command, according to an embodiment of the invention.

FIG. 7 depicts a flowchart of example processing for a set breakpoint command, according to an embodiment of the invention. Control begins at block 700. Control then continues to block 703 where the debugger 150 reads the debug data 156, and in response the debugger 150 indicates to the user, via the user I/O device 121, that the lines in the module 152 with a snapshot flag 526 that indicates true are available for setting breakpoints and that the lines in the module 152 with a snapshot flag 526 that indicates false are not available for setting breakpoints or are disallowed from having breakpoints set. Control then continues to block 705 where the debugger 150 receives a set breakpoint command from a user via the user I/O device 121, from the IDE 158, or from the client computer 132 via the network 130. The set breakpoint command identifies a line in a module 152. The set breakpoint command requests that the debugger 150 set a breakpoint at a machine instruction in the object code 154 that implements the source statement in the identified line, so that the object code 154, when executed, halts execution just before executing that machine instruction (and after execution of the immediately preceding machine instruction). The debugger 150 receives the set breakpoint command while execution of the object code 154 is halted.

Control then continues to block 710 where the debugger 150 determines whether snapshot instructions exist immediately before an instruction in the object code 154 that implements the source statement at the identified line in the module 152 and after the immediately preceding instruction that implements the source statement at the line immediately preceding the identified line in the module 152. In an embodiment, the debugger 150 makes the determination of block 710 by finding an entry in the debug data 156 with a module identifier field 520 and a line field 522 that match the identified module and line and determining whether the snapshot flag 526, in the same entry, indicates true. If the determination at block 710 is true, then snapshot instructions exist immediately before an instruction in the object code 154 that implements the source statement at the identified line in the module 152 and after the immediately preceding instruction that implements the source statement at the line immediately preceding the identified line in the module 152, so control continues to block 715 where the debugger 150 sets the breakpoint at the machine instruction in the object code 154 that implements the source statement of the line and updates the breakpoint table 157. In an embodiment, the debugger 150 sets the breakpoint at the machine instruction by copying the machine instruction and the line number to the breakpoint table 157 and replacing the machine instruction in the object code 154 with an invalid opcode. Control then continues to block 799 where the logic of FIG. 7 returns. In various embodiments, the execution of the object code 154 continues or restarts following the return at block 799, or the user may initiate another set breakpoint command or another debug command.

If the determination at block 710 is false, then snapshot instructions do not exist immediately before an instruction in the object code 154 that implements the source statement at the identified line in the module 152 and after the immediately preceding instruction that implements the source statement at the line immediately preceding the identified line in the module 152, so control continues to block 720 where the debugger 150 returns or sends an error notification to the user via the user I/O device 121, indicating that a breakpoint is not allowed to be set at the requested line. The debugger 150 does not set or refrains from setting a breakpoint at the requested line. Control then continues to block 799 where the logic of FIG. 7 returns. In various embodiments, the execution of the object code 154 continues or restarts following the return at block 799 or the user may initiate another set breakpoint command or another debug command.

Figure 8:
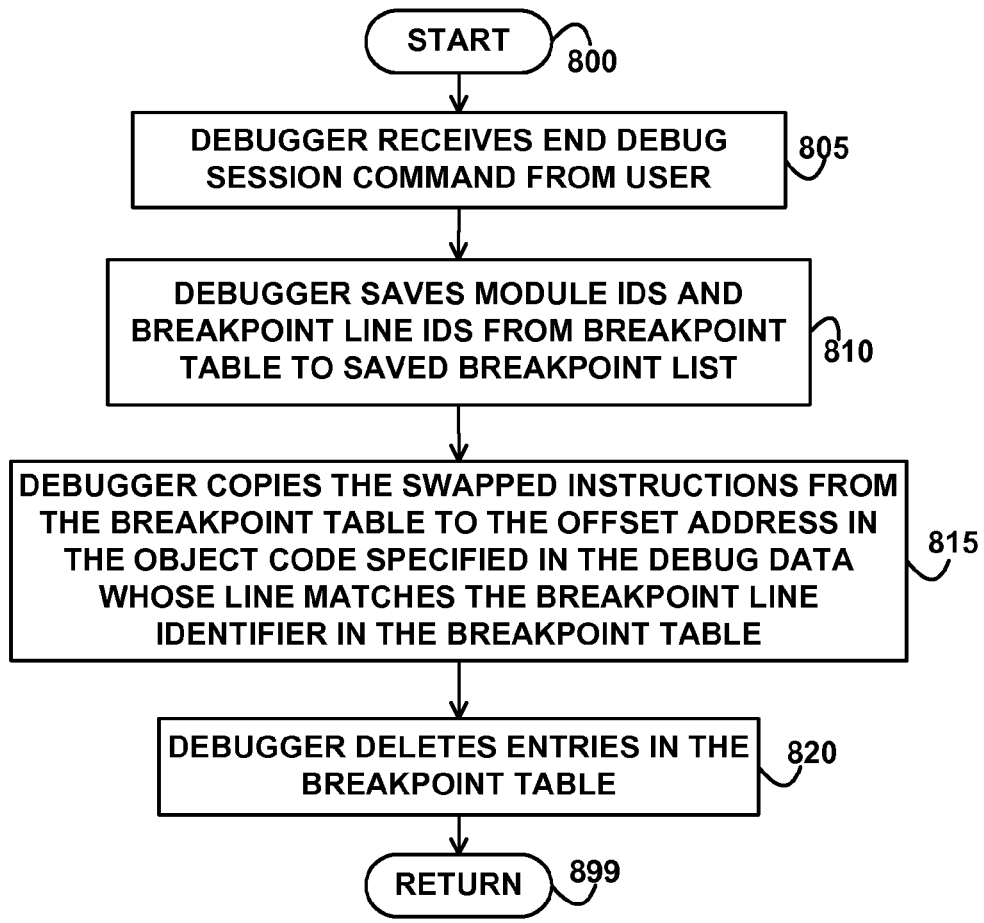
FIG. 8 depicts a flowchart of example processing for an end debug session command, according to an embodiment of the invention.

FIG. 8 depicts a flowchart of example processing for an end debug session command, according to an embodiment of the invention. Control begins at block 800. Control then continues to block 805 where the debugger 150 receives an end debug session command from the user via the user I/O device 121, from the IDE 158, or from the client computer 132 via the network 130. The end debug session command requests the debugger 150 to end the debug session and remove all breakpoints that are currently set.

In response to receipt of the end debug session command, control continues to block 810 where the debugger 150 saves module identifiers 310 and breakpoint line identifiers 312 from the entries in the breakpoint table 157 to the module identifier field 410 and the breakpoint line identifier field 412 in entries of the saved breakpoint list 159. Control then continues to block 815 where the debugger 150 copies the swapped instructions 314 from the breakpoint table 157 to the location in the object code 154 specified by the offset 524 in an entry in the debug data 156 whose line 522 matches the breakpoint line identifier 312 in the breakpoint table 157, which cancels or removes the breakpoint. Control then continues to block 820 where the debugger 150 deletes the entries from the breakpoint table 157. Control then continues to block 899 where the logic of FIG. 8 returns.

Figure 9:
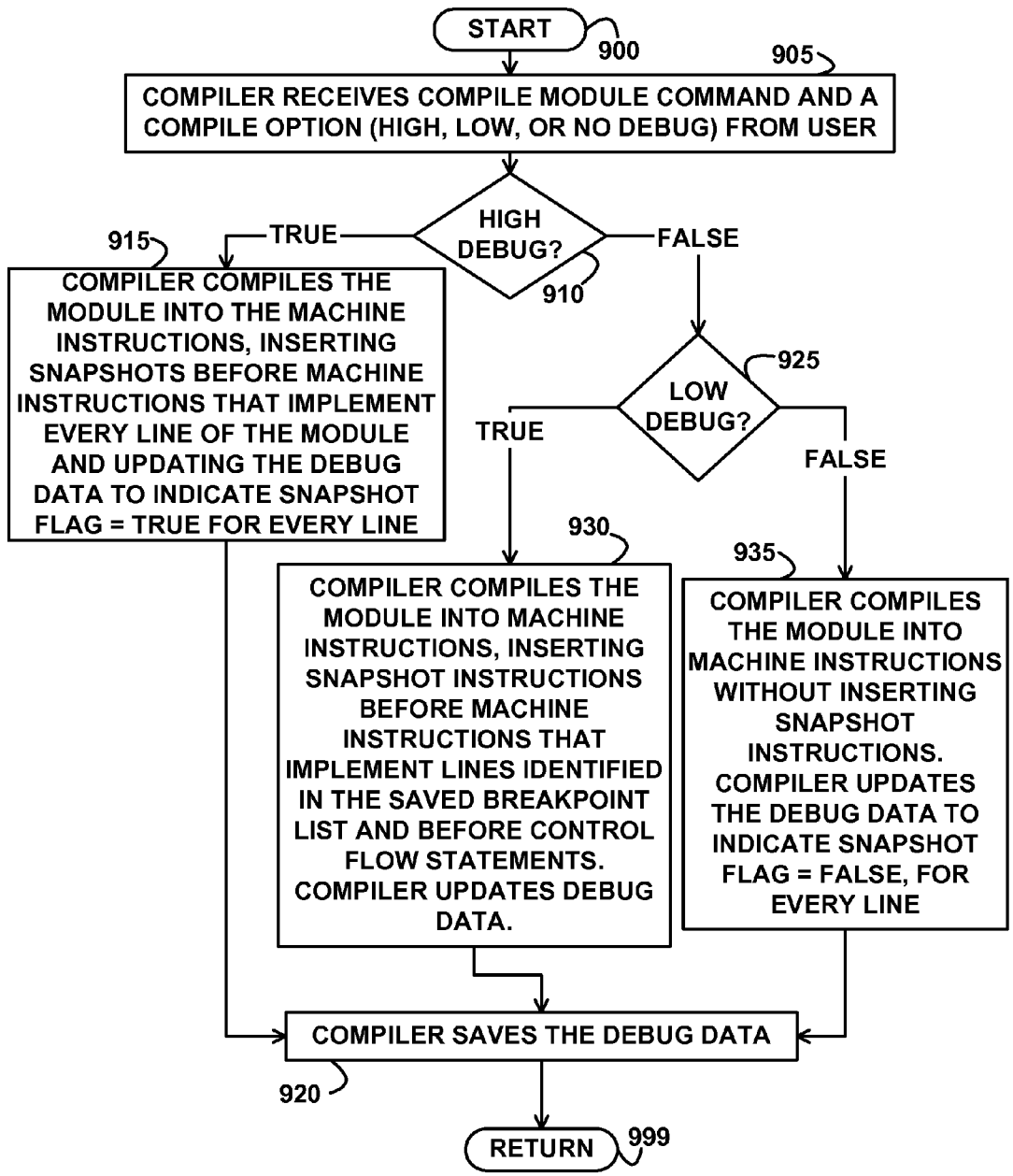
FIG. 9 depicts a flowchart of example processing for a compile module command, according to an embodiment of the invention.

FIG. 9 depicts a flowchart of example processing for a compile module command, according to an embodiment of the invention. Control begins at block 900. Control then continues to block 905 where the compiler 160 receives the compile module command and a debug compile option from a user via the user I/O device 121 or the client computer 132 via the network 130. The compile module command requests that the compiler 160 compile a module 152 specified by the command into the object code 154 using a debug compile option that specifies a first, second, or third debug compile option (e.g., a low debug compile option, a high debug compile option, or a no debug compile option).

Control then continues to block 910 where the compiler 160 determines whether the debug compile option specifies a high debug compile option. If the determination at block 910 is true, then the debug compile option specifies a high debug compile option, so control continues to block 915 where the compiler 160 compiles the module 152 into the machine instructions of the object code 154, inserting snapshot instructions before the machine instructions that implement each and every line of the module 152 and updating the debug data 156 to indicate that the snapshot flag 526 is true for every line in the module 152. Control then continues to block 920 where the compiler 160 saves the debug data 156. Control then continues to block 999 where the logic of FIG. 9 returns.

If the determination at block 910 is false, then the debug compile option does not specify a high debug compile option, so control continues to block 925 where the compiler 160 determines whether the debug compile option specifies a low debug compile option. If the determination at block 925 is true, then the compile debug option specifies a low debug compile option, so control continues to block 930 where the compiler 160 compiles the module 152 into machine instructions in the object code 154, inserting snapshot instructions immediately prior to those machine instructions in the object code 154 that implement lines identified in the saved breakpoint list 159 and immediately prior to those machine instructions that implement control flow statements, but not immediately prior to any other machine instructions. The compiler 160 does not insert snapshot instructions immediately prior to those machine instructions that both do not implement control flow statements and that did are not identified in the saved breakpoint list 159.

In an embodiment, a control flow statement is a statement in the module 152, for which execution of the machine instructions that implement the control flow statement result in the processor 101 making a choice between which of multiple paths through the object code 154 are followed by execution of the object code 154 on the processor 101. In various embodiments, execution of instructions that implement control flow statements cause continuation of execution at a different statement other than the next sequential instruction, such as an unconditional branch or jump or a call statement (from which flow of control may or may not return); such as executing a set of statements only if the criteria of a condition is met, such as a conditional branch statement; and such as executing a set of statements zero or more times, until some condition is met, such as loop statement. In an embodiment, execution of instructions that implement control flow statements causes (conditionally or unconditionally) the alteration of the contents of a program counter or instruction pointer of the processor 101 from a value that points at the next sequential instruction within the object code 154 to a different value, so that the order of execution of instructions in the object code 154 is changed (unconditionally or unconditionally).

In various embodiments, the program counter or instruction pointer holds either the memory address of the instruction being executed, or the address of the next instruction to be executed by the processor 101. In an embodiment, the processor 101 increments the program counter automatically after fetching a program instruction, so that the processor 101 normally retrieves instructions sequentially from the memory 102, with certain instructions, such as branches, jumps and subroutine calls and returns, interrupting the sequence by placing a new value in the program counter. Such jump instructions allow the processor 101 to choose a new address as the start of the next part of the flow of instructions from the memory 102.

The compiler 160 further sets the snapshot flag 526 of the debug data 156 to indicate true, for those statements implemented by machine instructions that have snapshot instructions inserted immediately prior to the machine instructions. The compiler 160 further sets the snapshot flag 526 of the debug data 156 to indicate false, for those statements implemented by machine instructions that do not have snapshot instructions inserted immediately prior to the machine instructions. Control then continues to block 920, as previously described above.

If the determination at block 925 is false, then the compile debug option specifies a no debug compile option, so control continues to block 935 where the compiler 160 compiles the module 152 into the machine instructions, without inserting snapshot instructions before the machine instructions that implement each and every line of the module 152. The compiler 160 further updates the debug data 156 to indicate that the snapshot flag 526 is false for every line in the module 152. Control then continues to block 920, as previously described above.

In this way, in an embodiment of the invention, when execution of the object code 154 halts at a breakpoint, the values of variables are selectively in the memory 102, even for the object code 154 that is optimized, where the values of variables may be temporarily stored in registers and not immediately stored to the memory 102.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   receiving a command that specifies a debug compile option and requests a compile of a module into object code within a current debugging session;
   if the debug compile option specifies a first debug compile option within the current debugging session, inserting snapshot instructions immediately prior to each machine instruction in the object code at which a breakpoint was previously set within a previous debugging session that has ended but at which the breakpoint is not currently set within the current debugging session, wherein the snapshot instructions, when executed, save values of every variable referenced anywhere by the module from a respective register to a respective location in memory; and
   if the debug compile option specifies the first debug compile option within the current debugging session, inserting the snapshot instructions immediately prior to each machine instruction in the object code that implements a control flow statement.

2. The method of claim 1, further comprising:
   if the debug compile option specifies the first debug compile option within the current debugging session, refraining from inserting the snapshot instructions immediately prior to each machine instruction at which the breakpoint was not previously set and that do not implement the control flow statement.

3. The method of claim 1, further comprising:
   if the debug compile option specifies a second debug compile option within the current debugging session, inserting the snapshot instructions immediately prior to machine instructions in the object code that implement each line in the module.

4. The method of claim 1, further comprising:
   indicating to a user within the current debugging session that lines in the module implemented by machine instructions with snapshot instructions immediately prior are available for setting of breakpoints.

5. The method of claim 1, further comprising:
   indicating to a user within the current debugging session that lines in the module implemented by machine instructions without snapshot instructions immediately prior are unavailable for setting of breakpoints.

6. The method of claim 1, further comprising:
in response to a request to set the breakpoint at a line in the module implemented by machine instructions without snapshot instructions immediately prior, refraining from setting the breakpoint.

7. A non-transitory computer-readable storage medium encoded with instructions, wherein the instructions when executed comprise:
receiving a command that specifies a debug compile option and requests a compile of a module into object code within a current debugging session;
if the debug compile option specifies a first debug compile option within the current debugging session, inserting snapshot instructions immediately prior to each machine instruction in the object code at which a breakpoint was previously set within a previous debugging session that has ended but at which the breakpoint is not currently set within the current debugging session, wherein the snapshot instructions, when executed, save values of every variable referenced anywhere by the module from a respective register to a respective location in memory; and
if the debug compile option specifies the first debug compile option within the current debugging session, inserting the snapshot instructions immediately prior to each machine instruction in the object code that implements a control flow statement.

8. The non-transitory computer-readable storage medium of claim 7, further comprising:
if the debug compile option specifies the first debug compile option within the current debugging session, refraining from inserting the snapshot instructions immediately prior to each machine instruction at which the breakpoint was not previously set and that do not implement the control flow statement.

9. The non-transitory computer-readable storage medium of claim 7, further comprising:
if the debug compile option specifies a second debug compile option within the current debugging session, inserting the snapshot instructions immediately prior to machine instructions in the object code that implement each line in the module.

10. The non-transitory computer-readable storage medium of claim 7, further comprising:
indicating to a user within the current debugging session that lines in the module implemented by machine instructions with snapshot instructions immediately prior are available for setting of breakpoints.

11. The non-transitory computer-readable storage medium of claim 7, further comprising:
indicating to a user within the current debugging session that lines in the module implemented by machine instructions without snapshot instructions immediately prior are unavailable for setting of breakpoints.

12. The non-transitory computer-readable storage medium of claim 7, further comprising:
in response to a request to set the breakpoint at a line in the module implemented by machine instructions without snapshot instructions immediately prior, refraining from setting the breakpoint.

13. A computer system comprising:
a processor; and
memory communicatively coupled to the processor, wherein the memory is encoded within instructions, and wherein the instructions when executed on the processor comprise
receiving a command that specifies a debug compile option and requests a compile of a module into object code within a current debugging session,
if the debug compile option specifies a first debug compile option within the current debugging session, inserting snapshot instructions immediately prior to each machine instruction in the object code at which a breakpoint was previously set within a previous debugging session but at which the breakpoint is not currently set within the current debugging session, wherein the snapshot instructions, when executed, save values of every variable referenced anywhere by the module from a respective register to a respective location in memory, and
if the debug compile option specifies the first debug compile option within the current debugging session, inserting the snapshot instructions immediately prior to each machine instruction in the object code that implements a control flow statement.

14. The computer system of claim 13, wherein the instructions further comprise:
if the debug compile option specifies the first debug compile option within the current debugging session, refraining from inserting the snapshot instructions immediately prior to each machine instruction at which the breakpoint was not previously set and that do not implement the control flow statement.

15. The computer system of claim 13, wherein the instructions further comprise:
if the debug compile option specifies a second debug compile option within the current debugging session, inserting the snapshot instructions immediately prior to machine instructions in the object code that implement each line in the module.

16. The computer system of claim 13, wherein the instructions further comprise:
indicating to a user within the current debugging session that lines in the module implemented by machine instructions with snapshot instructions immediately prior are available for setting of breakpoints.

17. The computer system of claim 13, wherein the instructions further comprise:
indicating to a user within the current debugging session that lines in the module implemented by machine instructions without snapshot instructions immediately prior are unavailable for setting of breakpoints.

18. The computer system of claim 13, wherein the instructions further comprise:
in response to a request to set the breakpoint at a line in the module implemented by machine instructions without snapshot instructions immediately prior, refraining from setting the breakpoint.

* * * * *